(12) United States Patent
Stevens et al.

(10) Patent No.: US 9,181,505 B2
(45) Date of Patent: Nov. 10, 2015

(54) INTEGRATED BIOFUEL PROCESS

(75) Inventors: James F. Stevens, Katy, TX (US); Mukund R. Karanjikar, Sandy, UT (US); Kerry K. Spilker, Houston, TX (US); Douglas Gene Naae, Sugar Land, TX (US); Dennis P. Essl, Sugar Land, TX (US); Peter Charles Ricci, Spring, TX (US); Zoran Mirkovic, Pearland, TX (US); Thomas M. Vu, Houston, TX (US); Stephen J. Decanio, Richmond, TX (US); Jerry M. Rovner, Houston, TX (US); Jason C. Hicks, Katy, TX (US)

(73) Assignee: Texaco Inc. & Texaco Development Corporation, San Ramon, CA (US)

( * ) Notice: Subject to any disclaimer, the term of this patent is extended or adjusted under 35 U.S.C. 154(b) by 815 days.

(21) Appl. No.: 12/477,450

(22) Filed: Jun. 3, 2009

(65) Prior Publication Data

US 2010/0307052 A1 Dec. 9, 2010

(51) Int. Cl.

| | |
|---|---|
| *C10L 1/18* | (2006.01) |
| *C10L 1/02* | (2006.01) |
| *C01B 3/38* | (2006.01) |
| *C01B 3/48* | (2006.01) |
| *C10G 1/06* | (2006.01) |
| *C10G 3/00* | (2006.01) |
| *B01J 23/36* | (2006.01) |
| *B01J 23/745* | (2006.01) |

(52) U.S. Cl.
CPC ... *C10L 1/02* (2013.01); *C01B 3/38* (2013.01); *C01B 3/48* (2013.01); *C10G 1/06* (2013.01); *C10G 3/45* (2013.01); *C10G 3/46* (2013.01); *C10G 3/47* (2013.01); *C10G 3/52* (2013.01); *B01J 23/36* (2013.01); *B01J 23/745* (2013.01); *C01B 2203/0233* (2013.01); *C01B 2203/0283* (2013.01); *C01B 2203/1041* (2013.01); *C01B 2203/1211* (2013.01); *C10G 2300/1011* (2013.01); *C10G 2300/1014* (2013.01); *Y02E 50/30* (2013.01)

(58) Field of Classification Search
None
See application file for complete search history.

(56) References Cited

U.S. PATENT DOCUMENTS

| | | | |
|---|---|---|---|
| 4,670,613 | A | 6/1987 | Ruyter et al. |
| 5,400,726 | A | 3/1995 | Dumons |
| 5,871,638 | A | 2/1999 | Pradhan et al. |
| 5,977,290 | A | 11/1999 | Siebenhaar |
| 6,812,186 | B2 | 11/2004 | Choudary et al. |
| 7,060,859 | B2 | 6/2006 | Figueras et al. |
| 7,262,331 | B2 | 8/2007 | van de Beld et al. |
| 2005/0095183 | A1* | 5/2005 | Rehmat et al. ............ 422/188 |
| 2007/0135316 | A1 | 6/2007 | Koivusalmi et al. |
| 2009/0217922 | A1* | 9/2009 | Fukuoka et al. .............. 127/37 |

FOREIGN PATENT DOCUMENTS

| | | | |
|---|---|---|---|
| EP | 1 022 058 A1 | 7/2000 | |
| WO | WO 01/16063 A1 | 3/2001 | |
| WO | WO 03/045841 A1 | 6/2003 | |
| WO | WO 2004/039918 A2 | 5/2004 | |
| WO | WO 2006/026863 * | 3/2006 | ............ B09B 3/00 |
| WO | WO 2007/100052 * | 7/2007 | ............ B01J 23/44 |
| WO | WO 2007/103858 A2 | 9/2007 | |
| WO | WO 2007/112314 A2 | 10/2007 | |

OTHER PUBLICATIONS

Datar et al. "Hydrogen production from the fermentation of corn stover biomass pretreated with a steam-explosion process" International Journal of Hydrogen Energy 32 (2007) 932-939.*

Ayabe et al. "Catalytic autothermal reforming of methane and propane over supported metal catalysts" Applied Catalysis A: General 241 (2003) 261-269.*

Van Ginkel et al. "Biohydrogen Production as a Function of pH and Substrate Concentration" Environ. Sci. Technol. 2001, 35, 4726-4730.*

Pasquini et al. "Extraction of lignin from sugar cane bagasse and Pinus taeda wood chips using ethanol-water mixtures and carbon dioxide at high pressures".*

Rajeshwari et al., "State-of-the-art of anaerobic digestion technology for industrial wastewater treatment", 4(2) Renew. and Sust. Ener. Rev. (Jun. 2000), pp. 135-156.

\* cited by examiner

*Primary Examiner* — Thane Underdahl
(74) *Attorney, Agent, or Firm* — Gregory L. Porter; Andrews Kurth LLP

(57) ABSTRACT

The instant invention pertains to new processes which produce an energy source effectively, efficiently, and in a more environmentally friendly manner. The process comprises hydrolyzing a lignocellulosic feedstock to form lignocellulosic hydrolyzate and a hydrolyzate residue. The lignocellulosic hydrolyzate is treated to produce hydrogen. The hydrolyzate residue may be reacted with hydrogen in the presence of a catalyst to yield the energy source.

23 Claims, 6 Drawing Sheets

US 9,181,505 B2

INTEGRATED BIOFUEL PROCESS

FIELD OF THE INVENTION

Provided herein is a hydrolysis process for producing an energy source from lignocellulosic feedstock.

BACKGROUND AND SUMMARY OF THE INVENTION

In light of energy prices and environmental concerns, processes for the production of fuels from renewable feedstocks are needed. The most common process involves producing ethanol from corn. Unfortunately, using corn and the like as precursors competes with food and feed supplies.

Some processes employ lignocellulosic biomass as a feedstock because it is readily available and competitively priced. Lignocellulosic biomass often comprises polymeric carbohydrates (cellulose and hemicelluose), complex poly-aromatics (lignin), extractives and ashes and thereby does not compete with food and feed supplies. For example, WO 2007/103858 describes using biomass-derived carbohydrates to form alkanes. An aldol condensation of acetone with furfural or 5-hydroxymethyl furfural (HMF) followed by reduction of the coupled product in hydrogen gives alkanes having from approximately 8 to 18 carbon atoms. Unfortunately, the described process has numerous disadvantages. For example, the reactions often require a high strength base. Moreover, the low degree of branching of the derived alkanes also results in low octane numbers which limit their use in gasoline.

Other processes of converting lignocellulosic biomass to useful forms of energy include gasification with subsequent conversion of the carbon monoxide/hydrogen syngas to liquid hydrocarbons via a Fischer-Tropsch reaction. Unfortunately, such processes typically require natural gas or petroleum products to produce the hydrogen. In sum, the production of practical fuels from biomass using prior art methods is inefficient and often cost prohibitive.

Accordingly, new processes are needed for use in making biofuels which are more efficient and more cost effective. Advantageously, new processes have been discovered that meets the aforementioned needs and more.

In one embodiment, a process for producing an energy source comprises step a) of first hydrolyzing a lignocellulosic feedstock in the presence of a hydrolyzing catalyst to form a first mixture comprising lignocellulosic hydrolyzate and a hydrolyzate residue. The lignocellulosic hydrolyzate is treated to produce a second mixture comprising hydrogen in step b). In step c) at least a portion of the hydrolyzate residue of the first mixture may then be reacted with hydrogen in the presence of a catalyst to yield an energy source.

In another embodiment, a process for producing an energy source comprises first hydrolyzing a lignocellulosic feedstock in the presence of water, alcohol, and carbon dioxide at a temperature of from about 220° C. to about 290° C. to form a first mixture comprising lignocellulosic hydrolyzate and a hydrolyzate residue. The lignocellulosic hydrolyzate may be reformed to produce a second mixture comprising hydrogen. At least a portion of the hydrolyzate residue of the first mixture may be reacted with at least a portion of the hydrogen produced in step b) in the presence of a catalyst to yield an energy source.

In another embodiment a liquid energy source is produced. The liquid energy source is derived from lignin and comprises from about 18 to about 28 percent by weight oxygen, from about 65 to about 84 percent by weight carbon, and hydrogen.

DETAILED DESCRIPTION OF THE INVENTION

Figure 1:
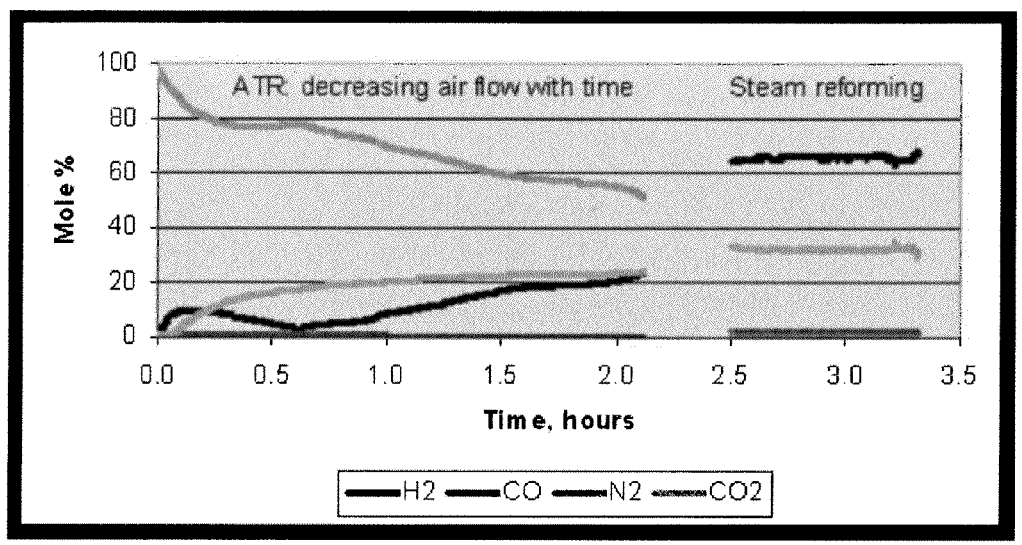
FIG. 1 shows the mole percent of various gases over time for autothermal reforming and steam reforming of Example 2.

The instant invention relates to a process for producing an energy source. The process first comprises hydrolyzing a lignocellulosic feedstock in the presence of a hydrolyzing catalyst to form a first mixture comprising lignocellulosic hydrolyzate and a hydrolyzate residue. The origin and type of the lignocellulosic feedstock employed is not particularly critical so long as it is capable of undergoing the steps of the process to yield an energy source. In one embodiment a particularly preferable feedstock is a plant biomass typically comprised of, for example, cellulose, hemicellulose, poly (aromatics), such as lignin, extractives, ash, and mixtures thereof. Such lignocellulosic feedstocks often comprise carbohydrate polymers (cellulose and hemicelluloses) which may bond to the lignin. Biomass comes in many different types, which may be grouped into a few main categories: wood or forestry residues, including sawmill and paper mill discards, municipal paper waste, algae, agricultural residues, including corn stover (stalks and straw), and sugarcane bagasse, and dedicated energy crops, which are mostly composed of fast growing tall, woody grasses such as, for example, switchgrass. Any of the aforementioned may find use in the instant invention. A particularly preferable biomass comprises one with high lignin content, i.e., lignin content of greater than about 15, preferably greater than about 25 weight percent of the biomass as measured by ASTM D-1106-84 "Standard test Method for Acid insoluble Lignin in Wood."

Depending upon the nature of the lignocellulosic feedstock it may be desirable to reduce at least a portion of it in size prior to hydrolyzing in order to expose additional surface area and facilitate the hydrolysis and the steps following hydrolysis. Such reduction may be done in any convenient manner such as by grinding, cutting, chopping, etc. The desired size of the lignocellulosic feedstock varies depending upon the type of ingredients and other specifics of the hydrolysis and the steps following hydrolysis. Typically, smaller size feedstocks react quicker but cost more to produce. Generally, it is advantageous if the lignocellulosic feedstock is reduced prior to hydrolyzing to a particle size of less than about 2 mm, preferably less than 1 mm, in its smallest dimension.

Similarly, it is often advantageous, or may even be necessary, in some situations to first purify at least a portion of the lignocellulosic feedstock prior to hydrolyzing it. By purify is meant to partially clean in order to remove at least some contaminants that negatively effect downstream processes. This purification may assist in reducing or eliminating any undesired reactions in the following steps. The type of purification will depend upon the source of the lignocellulosic feedstock, as well as, the amount and nature of the impurities. Often, simple washing of the lignocellulosic feedstock is sufficient. Such purification, if done, may be accomplished prior to, in conjunction with, or subsequent to any size reduction.

The hydrolysis of lignocellulosic feedstock can be accomplished in any convenient manner in any convenient reactor so long as a mixture comprising lignocellulosic hydrolyzate and a hydrolyzate residue is formed. The specific catalyst employed will vary depending upon the starting materials and desired products. Typically, the hydrolyzing catalyst is selected from the group consisting of heat, an acid, or mixture thereof.

If heat is to be employed alone, then a suitable elevated temperature is employed until the desired first mixture comprising lignocellulosic hydrolyzate and a hydrolyzate residue is formed. Generally, the temperature should be high enough for a sufficient amount of time for the hemicellulose in the starting material to release a catalytic amount of acetic acid. Such temperatures vary depending upon factors such as the starting materials. However, typically for most starting materials when heat alone is employed as the catalyst the temperature should be at least about 240° C., preferably at least about 250° C. up to about 300° C., preferably up to about 275° C. When the lignocellulosic feedstock is, for example, pine then a suitable catalytic temperature range is from about 220° C. to about 290° C., preferably from about 250° C. to about 260° C. Similarly, when the lignocellulosic feedstock is, for example, switchgrass then a suitable catalytic temperature range is from about 220° C. to about 260° C., preferably from about 230° C. to about 250° C. for a time of from about 1 to about 30 minutes, preferably from about 2 to about 5 minutes.

If one desires, an acid hydrolyzing catalyst may be employed instead of heat or in conjunction with heat. Such acid addition may allow for the use of decreased temperatures and residence time. When employed in conjunction with heat, typically the feedstock is heated to a temperature of, for example, from about 170° C. to about 300° C. Suitable acids include weak acids. Such acids typically have a pH of less than about 4, preferably less than about 3. Preferred acids include an acid selected from the group consisting of carbonic acid ($CO_2$), acetic acid, formic acid, nitric acid, and sulfuric acid. The amount of acid employed varies depending upon the acid, the temperature, and the desired yield. Generally, the lower the temperature, the lower the pH should be in order to increase the yield. Correspondingly, the higher the temperature is, the less strong the acid need be. When acids are employed the mole ratio of acid to lignocellulosic feedstock is generally that amount which is sufficient to reduce the pH of the solution to less than 4, preferably less than 3. In one embodiment at least a portion of the product of the hydrolysis may be subjected to one or more additional hydrolysis steps in order to facilitate a better yield.

The acid is contacted with the lignocellulosic feedstock under hydrolysis conditions for a time sufficient to yield the desired amounts of lignocellulosic hydrolyzate and a hydrolyzate residue. Such conditions may vary depending upon the specific acid and specific lignocellulosic feedstock employed, as well as, the desired products. Generally, the hydrolysis step(s) comprise employing an elevated temperature. Control of the residence time and temperature allows one to control the mass balance. For example, maintaining a substantial constant feed rate and varying the temperature allows one to control the conversion of the feedstock. In one embodiment, a temperature of at least about 150° C., preferably at least about 170° C. up to a temperature of at most about 300° C., preferably at most 290, more preferably at most 250° C. is employed during the hydrolysis. Preferably, one or more of the aforementioned hydrolysis steps may be conducted in the presence of water, an alcohol such as ethanol, or a mixture thereof.

Advantageously, a high temperature hydrolysis separates cellulose and lignin fractions, provides a hydrolyzate residue with reduced amounts of oxygen which requires less hydrogen to react with it, and results in increased yields. Upon hydrolysis a mixture comprising lignocellulosic hydrolyzate and a hydrolyzate residue typically results. In one embodiment, the amount of hydrolyzate residue formed is at least about 40% by mass based on the initial dry weight of the lignocellulosic feedstock. Advantageously, the reaction with lignin forms a hydrolyzate residue that is often greater in mass than the Klason lignin in the feedstock. In some embodiments, the Klason lignin in the residue of step a) of the process may be greater than about 90, preferably greater than 93, preferably greater than about 95, more preferably greater than about 97% Klason lignin. Also, advantageous is that the hydrolyzate residue often comprises from about 20 to about 25% oxygen as compared to 25 to 33% oxygen in native lignin. While the amount of hydrolyzate residue formed in this step varies depending upon the feedstock and reaction conditions, typical amounts of the hydrolyzate residue from step a) may comprise from about 30 to about 55% by mass based on the initial weight of the lignocellulosic feedstock.

Typically, the lignocellulosic hydrolyzate is usually in a substantially liquid to fully liquid form while the hydrolyzate residue is in a substantially solid to fully solid form. This is advantageous in that the solid may be separated from the liquid in any convenient manner for further processing. Such separation manners include, for example, filtration, centrifugation, and the like.

Upon separation, the lignocellulosic hydrolyzate is treated to produce hydrogen and fuel gases. If desired, at least a portion of the hydrolyzate residue is reacted with hydrogen in the presence of a catalyst to yield an energy source. Advantageously, it is not usually required to neutralize the lignocellulosic hydrolyzate before reforming. However, it may be advantageous to do so in some situations, e.g., if a strong acid was employed or if an acid residue remains.

The treating of the lignocellulosic hydrolyzate in step b) may be conducted in any convenient manner to produce a second mixture comprising hydrogen. Reforming conventionally employs oxygen and carbon dioxide or steam with methane in a reaction over a supported metal catalyst to form syngas.

The supported metal catalyst is not critical so long as it catalyzes reforming. Suitable reforming catalysts are often a metal or metallic compound dispersed on and/or in a porous, thermally stable supporting material(s) that increases the reaction rate of hydrocarbons, such as methane, with steam at high temperatures, for example, from about 600 to about 825° C. The catalytically active material may be one or more metals from Group VIII of the Periodic Table, a non-precious Group VII metal such as nickel or cobalt, a Group VII precious metal such as platinum, palladium, ruthenium, or rhodium, or some mixture thereof. If employing a Group VIII metal, then the catalyst content, if non-noble, is typically from about 30 to about 60% of the total catalyst weight whereas if a precious metal is employed then the concentration may range from about 0.005 to about 5% of the total catalyst weight.

The support typically comprises alumina, especially gamma or eta alumina. Often chromia and rare earth oxides take up at least part of the support. Other useful support oxides are titania, zirconia, hafnia, thoria, vanadia, urania, oxides of manganese, molybdenum and tungsten and combined oxides. The support material typically has a pore volume over 0.2 cm$^3$/g and a surface area of at least 1.0, preferably over 15, especially in the range 50-200 m$^2$/g.

Reforming methods useful herein may comprise steam reforming, autothermal reforming, or a combination thereof. If the hydrolyzate is to be reformed directly then it may be advantageous to reduce the amount of sugars. While this can be done in any convenient manner, maintaining the hydrolyzate at an elevated temperature for some period of time may be useful, e.g, from about 220° C. to about 280° C. for from about 15 to about 30 minutes. If desired, a suitable catalyst may be employed to reduce the temperature and/or holding times.

Another manner of treating is anaerobic digestion. This may be used in place of or in addition to any reformation in order to convert the hydrolyzate to methane and then subsequently to hydrogen. Such anaerobic digestion is described in, for example, Rajeshwari et al., "State-of-the-art of anaerobic digestion technology for industrial wastewater treatment", Renewable and Sustainable Energy Reviews, Vol. 4, Issue 2, June 2000, pp. 135-56 which is incorporated herein by reference. Typically anaerobic digestion produces a gas with the major components of carbon dioxide and methane. This mixture can be converted to a hydrogen rich stream by several methods such as steam reforming, dry reforming, or autothermal reforming followed by water-gas shifting and purification.

As described above, the hydrolyzate residue is reacted with hydrogen in the presence of a catalyst to yield an energy source. Advantageously, in one embodiment at least a portion of the hydrogen produced in the reforming step may be used in this step. If desired, the hydrolyzate residue and/or energy source may be at least partially to fully deoxygenated. In this manner, fuels more suitable for transportation are often obtainable.

Figure 4:
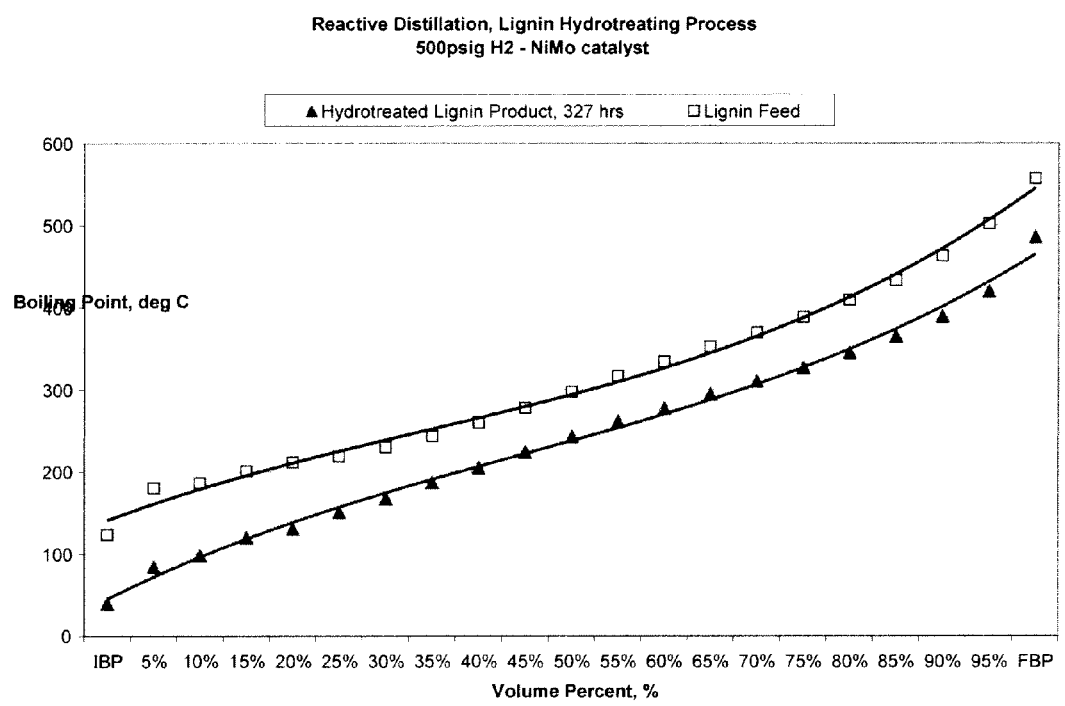
FIG. 4 illustrates the change in composition from the feed to the product for Example 4.

An example of a suitable reactor is shown in FIG. 4. This specific reactor consists of two concentric reactor tubes, an inner reactor tube with down flow to the bottom of the reactor, and an outer up flow reactor tube. Each tube is capable of being loaded with either layers of the same or different suitable supported catalysts or an inert solid support. Hydrogen and the liquid feed may be introduced at the top of the reactor unit and fed into the inner reactor tube. Excess hydrogen, plus product gases and vapors may exit at the top of the reactor after passing through the outer reactor tube. An oven temperature controller can be set to provide a temperature gradient from the top of the reactor unit to the bottom of the unit. The top of the unit would typically have a lower temperature, while the middle and bottom of the unit would have higher temperature.

Advantageously, the aforementioned processes are capable of producing a liquid energy source derived from lignin wherein the liquid energy source comprises from about 18 to about 28 percent by weight oxygen, from about 65 to about 84 percent by weight carbon, and hydrogen. Preferably, the liquid energy source comprises from about 20 to about 25 percent by weight oxygen, from about 70 to about 78 percent by weight carbon, and hydrogen. There are also sometimes trace amounts of such elements like nitrogen and/or sulpher. FIG. 8 shows the relative carbon, hydrogen and oxygen contents of the energy source derived from lignin in the present invention Although only exemplary embodiments are specifically illustrated and described herein, it will be appreciated that many modifications and variations of the process and apparatus described herein are possible in light of the above teachings and within the purview of the appended claims without departing from the spirit and intended scope of the claimed subject matter.

EXAMPLE 1

As an example a 30 gram sample of yellow pine was ground and placed in a stirred reactor with water. The reactor was sealed, pressurized with $CO_2$, and heated to 180° C. The reactor reached a pressure of about 1000 psig and was held at 180° C. for about 30 minutes. After cooling, the hydrozylate was separated from the hydrolysis residue by filtration. Portions of the hydrozylate and hydrolysis residue were analyzed. The hydrolysis residue was subjected to a second hydrolysis in which water, ethanol, and $CO_2$ were present. After the second hydrolysis step the hydrolysis residue was found to weigh 15.45 grams. A Klason lignin analysis of the residue showed that >95% of the residue was Klason lignin. A similar analysis of the starting material showed a Klason lignin content of 18.9% by weight. While not wishing to be bound by any theory it is believed that an increase in lignin is due to reaction of cellulose and hemicelluloses hydrolysis products with the lignin originally present in the sample. A CHNO analysis of the starting material and hydrolysis residue is shown below. The high temperature, weak acid hydrolysis resulted in 1) separation of cellulosic and lignin fractions, 2) an increase in the residue fraction mass which may result in a corresponding increase in potential liquid product yield, 3) a reduction in the amount of oxygen in the hydrolysis residue which offers a corresponding potential reduction in the amount of hydrogen required for any subsequent deoxygenation, and 4) production of a hydrozylate suitable for reforming to hydrogen.

| | Element (Mass %) | | | |
|---|---|---|---|---|
| Process | C | H | N | O* |
| Raw Material | 44.9 | 6.9 | 0.89 | 47.3 |
| Pretreat | 63.3 | 5.6 | 0.46 | 30.4 |
| Pretreat + Organosolv | 69.9 | 5.5 | 0.33 | 24.3 |

EXAMPLE 2

The hydrozylate from a $CO_2$ hydrolysis from a $CO_2$ hydrolysis test similar to Example 1 was fed to a stream reforming reactor loaded with a 0.5% by weight rhenium catalyst on alumina. For the first 2 hours the system was operated as an autothermal reformer with air flow gradually being reduced. After 2 hours the air flow was turned off and the reactor was operated as a steam reformer. Under both autothermal and steam reforming conditions a usable hydrogen product was produced with not noticeable reduction of catalyst activity or carbon formation. FIG. 1 shows the mole percent of various gases over time for the autothermal reforming and steam reforming.

EXAMPLE 3

Figure 2:
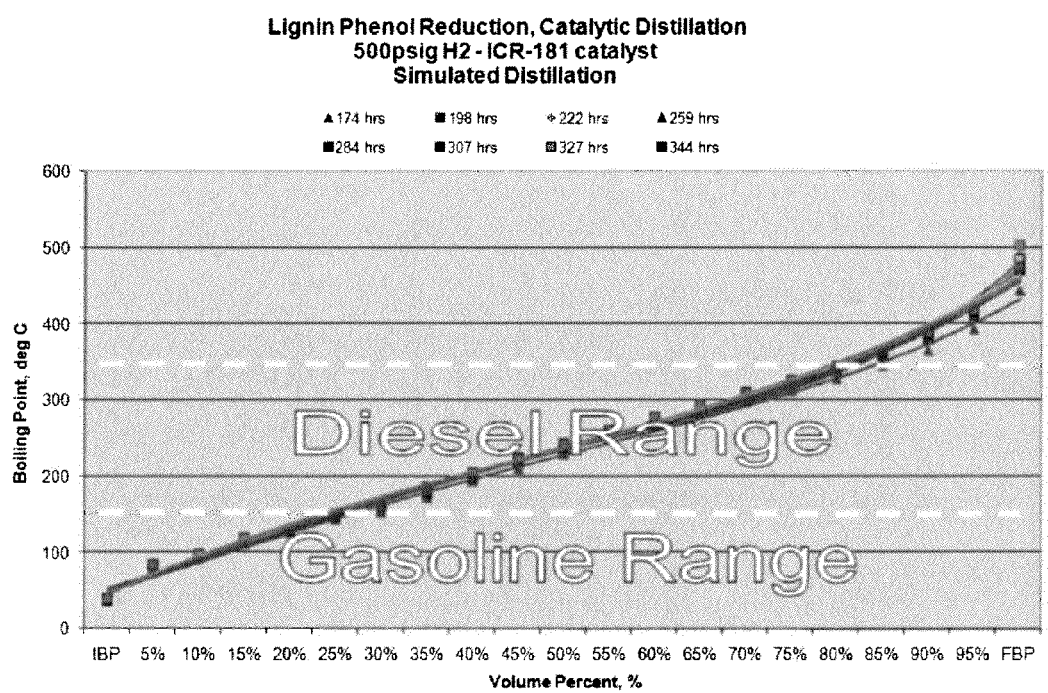
FIG. 2 shows the results of a gas chromatography simulated catalytic distillation of a lignin phenol reduction.

A slurry of lignin and iron catalyst in lignin product carrier was reacted with hydrogen. An analysis of the resulting liquid product is shown in the table below. A subsequent reaction of this first stage product with hydrogen over a Ni—Mo catalyst produced a much lighter product with properties similar to those of a transportation fuel. FIG. 2 shows the results of a gas chromatography simulated catalytic distillation of a lignin phenol reduction.

| Component or Property | Analysis |
|---|---|
| % C | 83.47 |
| % H | 9.23 |
| % N | 1.19 |
| % S | 0.40 |
| % H2O | 0.34 |
| % O (by diff) | 5.71 |
| % Ash | 0.34 |
| API Gravity | 6.26 (60° F.) |
| Density | 1.026 |

EXAMPLE 4

Figure 3:
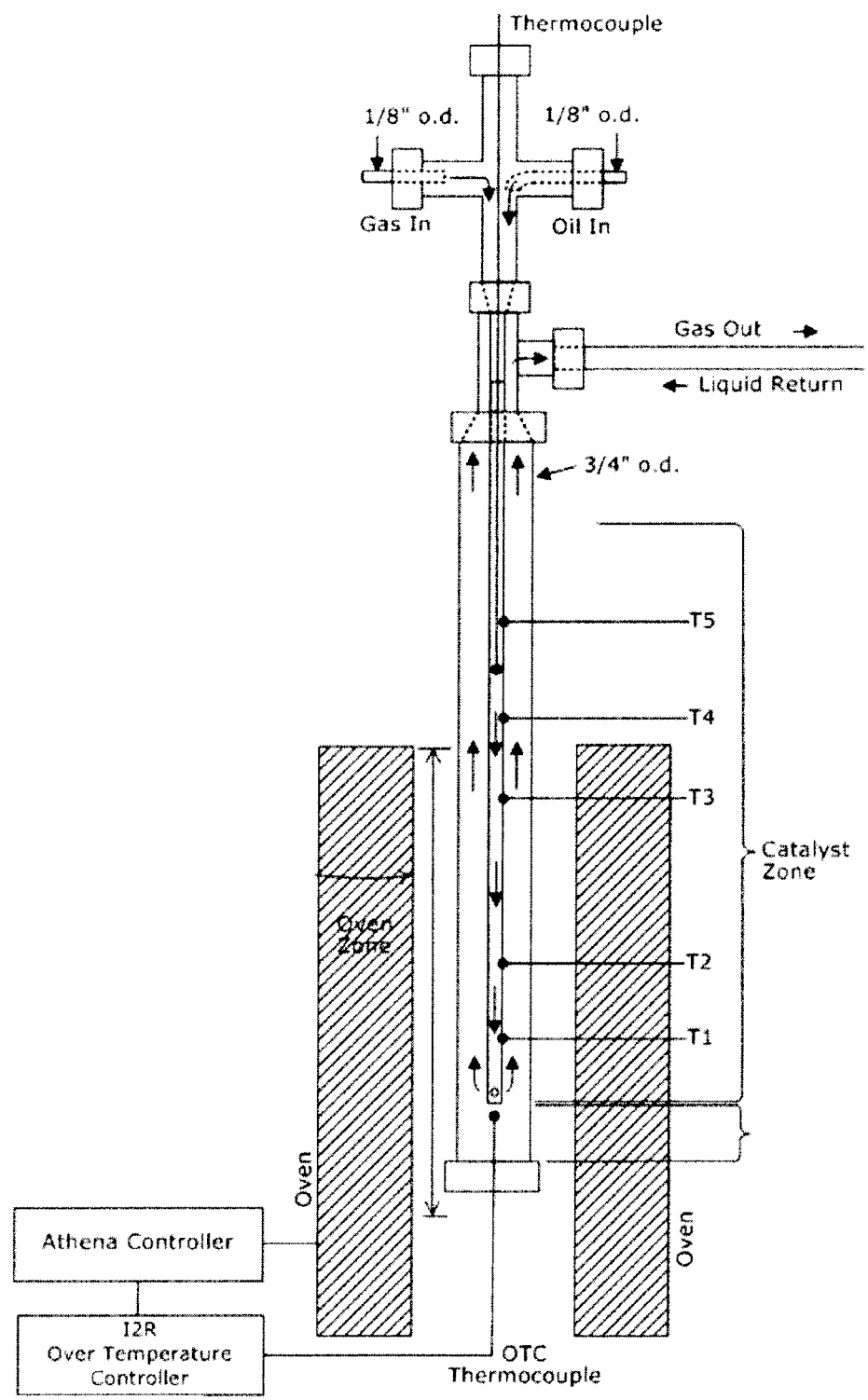
FIG. 3 is schematic drawing of a catalytic/reactive distillation reactor employed in Example 4.

40.85 g of a NiMo oxide on alumina hydrotreating catalyst, ICR 181 (commercially available from Chevron Lummus Global), was loaded into the catalytic/reactive distillation reactor which is shown in FIG. 3. The catalyst was then dried under flowing nitrogen, and then sulfided with DMDS (dimethyl disulfide), $(CH_3)_2S_2$, in n-heptane with hydrogen at 800 psig. The reactor conditions were 500 psig $H_2$ and 410° C.-420° C. The hydrogen flow rate was 13.5 std Liters per hour. The lignin feed was a mixture of 2% TNPS (tert-nonyl polysulfide) and a lignin which was previously partially hydrotreated so that it is a liquid and comprises a total oxygen content of from about 5 to about 10 weight percent based on the total weight of lignin. The feed rate was 2.5 mL per hour. The reactor run continued for 327 hrs. The total yield of hydrotreated lignin product was 87.7%. The lignin feed had an average oxygen analysis of 5.3% oxygen while the hydrotreated lignin product had a run average of 0.22% oxygen. FIG. 4 illustrates the change in composition from the feed to the product.

EXAMPLES 5-9

Figure 5:
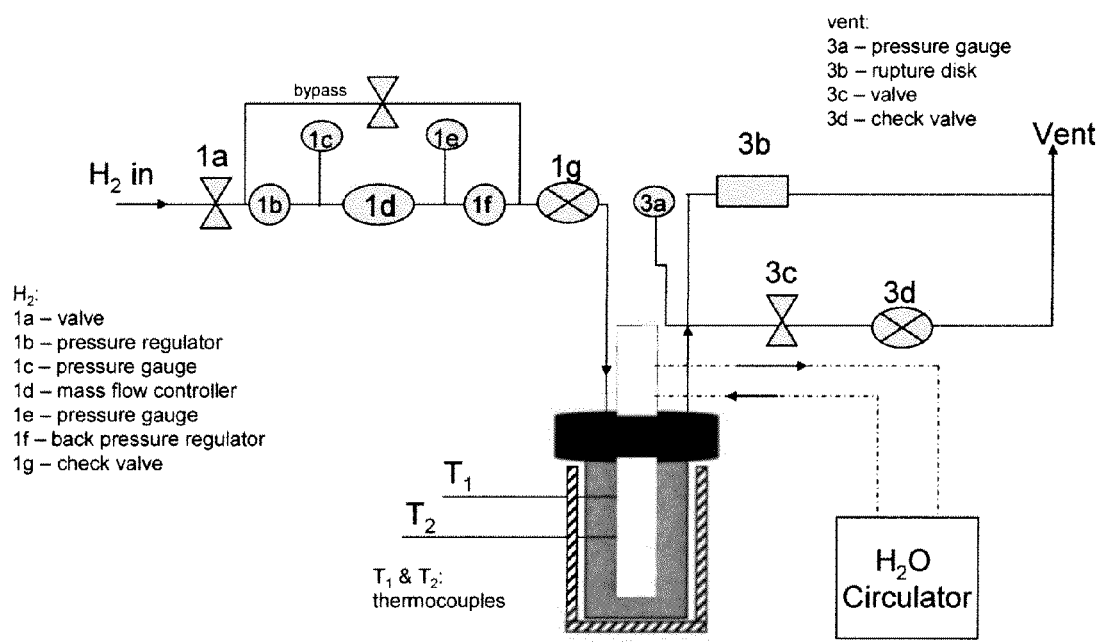
FIG. 5 illustrates a process employed in Examples 5-9.

Effect of Molybdenum Concentration on Solid-to-Liquid Conversions of Lignin Feedstocks Examples 5-9 were conducted according to the process diagram shown in FIG. 5. The general process of the lignin liquefaction of examples 5-9 occurred in a 300 mL autoclave reactor and began by slurrying 2.96 g of Kraft lignin (Westvaco) with 0.84 g of a catalyst promoter (Fe slurry catalyst) except for Example 8 in which no catalyst promoter was employed. Next, a molybdenum source (Molyvan A from R.T. Vanderbilt), and tetralin (TCI America) were added. The reactor was pressurized with 800 psig of hydrogen and the reaction was heated to 400-410° C. and maintained for 30-120 minutes.

The iron promoter used in Examples 5-7 and Example 9 was synthesized by dissolving approximately 100 g of $Fe_2(SO_3)_4*5H_2O$ in 150 mL of distilled $H_2O$. To the solution, approximately 13 g of $H_3PO_4$ was added and stirred for ~30 minutes, while monitoring the pH of the solution. The pH was adjusted by adding 28 wt % $NH_3$ (aq) until the pH was ~4.5 (~100 mL of $NH_3$ (aq) needed). The addition of $NH_3$ (aq) was slow, keeping the temperature of the solution at room temperature. The resulting aqueous slurry catalyst was used as noted below.

EXAMPLE 5

Lignin liquefaction experiments took place in a 300 mL Autoclave reactor. To obtain a Mo concentration of approximately 0.1%, 2.96 g of pretreated wood particles ($CO_2$ pretreated residue) was mixed with 0.84 g of Fe promoter. To the mixture, 0.0117 g of Molyvan A was added and manually stirred. The contents were added to the reactor and mixed with 29 mL of tetralin.

EXAMPLE 6

Lignin liquefaction experiments took place in a 300 mL Autoclave reactor. To obtain a Mo concentration of approximately 0.05%, 2.96 g of pretreated wood particles ($CO_2$ pretreated residue) was mixed with 0.84 g of Fe promoter. To the mixture, 0.0058 g of Molyvan A was added and manually stirred. The contents were added to the reactor and mixed with 29 mL of tetralin.

EXAMPLE 7

Lignin liquefaction experiments took place in a 300 mL Autoclave reactor. To obtain a Mo concentration of approximately 0.03%, 2.96 g of pretreated wood particles ($CO_2$ pretreated residue) was mixed with 0.84 g of Fe promoter. To the mixture, 0.0030 g of Molyvan A was added and manually stirred. The contents were added to the reactor and mixed with 29 mL of tetralin.

EXAMPLE 8

Lignin liquefaction experiments took place in a 300 mL Autoclave reactor. To obtain a Mo concentration of approximately 0.03%, 2.96 g of Kraft Lignin (Westvaco) was mixed with 0.0029 g of Molyvan A was added and manually stirred. The contents were added to the reactor and mixed with 29 mL of tetralin.

EXAMPLE 9

Lignin liquefaction experiments took place in a 300 mL Autoclave reactor. To obtain a Mo concentration of approximately 0.03%, 2.96 g of Kraft Lignin (Westvaco) was mixed with 0.84 g of Fe promoter. To the mixture, 0.0030 g of Molyvan A was added and manually stirred. The contents were added to the reactor and mixed with 29 mL of tetralin.

The results of Examples 5-9 are shown below.
Results of Examples 5-9
Effect of Mo Concentration on the Solid-to-Liquid Conversions of Lignin Feedstocks

| Example | Feedstock | % Mo | system pressure (psig) | Reaction temperature (° C.) | Time (min) | % solid-to-liquid conversion |
|---|---|---|---|---|---|---|
| 5 | Pretreated wood particles | 0.11 | 1500-1550 | 405 | 90 | 96 |
| 6 | Pretreated wood particles | 0.05 | 1500-1550 | 405 | 90 | 97 |
| 7 | Pretreated wood particles | 0.03 | 1500-1600 | 405 | 90 | 98 |
| 8 | Kraft Lignin | 0.03 | 1500-1700 | 405 | 60 | 94 |

-continued

| Example | Feedstock | % Mo | system pressure (psig) | Reaction temperature (° C.) | Time (min) | % solid-to-liquid conversion |
|---|---|---|---|---|---|---|
| 9 | Kraft Lignin | 0.03 | 1500-1700 | 405 | 60 | 92 |

EXAMPLE 10

Effect of pH and Temperature on Solid Dissolution

Figure 6:
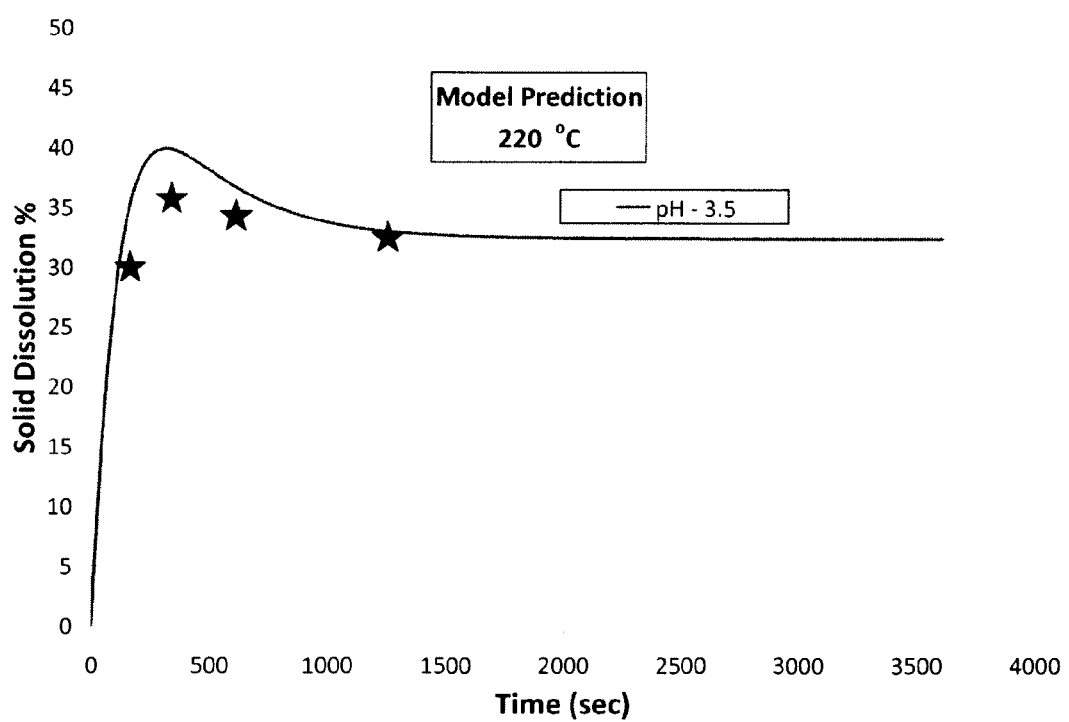
FIG. 6 shows data of Example 10 and predicted solid dissolution at 220° C.

A series of tests, in which a water/dilute acid-wood particles slurry was rapidly heated in a fluidized sand bath to a target temperature, held for a period of time, and then quickly cooled in an ice bath, were used to measure the amount of solids that would remain after the treatment. The amount of remaining solid was correlated with the pH, residence time, and temperature. The resulting correlations are combined with a correlation that predicts pH as a function of $CO_2$ pressure to predict the amount of solids that would remain after a mixture of wood particles, water, and $CO_2$ was heated in a reactor for a specified residence time. Three of the data points obtained and the predicted solid dissolution are shown in FIG. 6. It was found in this study that the pH tends to have a bigger effect on solid dissolution at lower temperatures for this system.

What is claimed is:

1. A process for producing an energy source comprising:
   a) hydrolyzing a lignocellulosic feedstock in the presence of a hydrolyzing catalyst to form a first mixture comprising lignocellulosic hydrolyzate and a hydrolyzate residue, wherein said hydrolyzate residue comprises Klason lignin in a greater percentage than said lignocellulosic feedstock;
   b) treating the lignocellulosic hydrolyzate to produce a second mixture comprising hydrogen; and
   c) reacting at least a portion of the hydrolyzate residue of the first mixture with hydrogen in the presence of a supported metal catalyst comprising Molybdenum for sufficient time, temperature and pressure to yield an energy source.

2. The process of claim 1 which comprises employing in step c) at least a portion of the hydrogen produced in step b).

3. The process of claim 1 wherein the lignocellulosic feedstock is reduced prior to hydrolyzing to a particle size of less than about 2 mm in its smallest dimension.

4. The process of claim 1 wherein the lignocellulosic feedstock is purified prior to hydrolyzing.

5. The process of claim 1 wherein the hydrolyzing catalyst is selected from the group consisting of heat, an acid, or mixture thereof.

6. The process of claim 1 wherein the hydrolyzing catalyst comprises heating the feedstock to a temperature of at least 240° C. and wherein said hydrolyzate residue comprises from about 30% to about 55% by mass based on the initial dry weight of the lignocellulose feedstock.

7. The process of claim 1 wherein the hydrolyzing catalyst comprises an acid having a pH of less than about 4.

8. The process of claim 1 wherein the hydrolyzing catalyst comprises an acid selected from the group consisting of carbonic acid, acetic acid, formic acid, nitric acid, and sulfuric acid.

9. The process of claim 1 wherein the lignocellulosic hydrolyzate is in a substantially liquid to fully liquid form.

10. The process of claim 1 wherein the hydrolyzate residue is in a substantially solid to fully solid form.

11. The process of claim 1 wherein the treating comprises steam reforming.

12. The process of claim 1 wherein the treating comprises authothermal reforming.

13. The process of claim 1 wherein the treating comprises anaerobic digesting.

14. The process of claim 1 wherein the hydrolyzing is conducted in the presence of water, alcohol, and carbon dioxide.

15. The process of claim 1 which further comprises neutralizing the lignocellulosic hydrolyzate before treating.

16. The process of claim 1 which is conducted in the absence of neutralizing the lignocellulosic hydrolyzate.

17. The process of claim 1 which comprises reacting substantially all of the hydrolyzate residue with hydrogen in the presence of a catalyst to yield an energy source.

18. The process of claim 1 which further comprises deoxygenating the hydrolyzate residue.

19. The process of claim 1 wherein the amount of hydrolyzate residue formed in step a) is from about 30 to about 55% by mass based on the initial weight of the lignocellulosic feedstock.

20. The process of claim 1 wherein the hydrolyzate residue of step a) comprises at least about 90 weight percent Mason lignin based on the total weight of hydrolyzate residue.

21. A process for producing an energy source comprising:
   a) hydrolyzing a lignocellulosic feedstock in the presence of water, alcohol, and carbon dioxide at a temperature of from about 220° C. to about 290° C. to form a first mixture comprising lignocellulosic hydrolyzate and a hydrolyzate residue;
   b) reforming the lignocellulosic hydrolyzate to produce a second mixture comprising hydrogen;
   c) reacting at least a portion of the hydrolyzate residue of the first mixture with at least a portion of the hydrogen produced in step b) in the presence of a catalyst comprising Molybdenum metal for sufficient time, temperature and pressure to yield an energy source.

22. The process of claim 21 which further comprises converting the energy source of step c) to a fuel suitable for transportation.

23. A process for producing an energy source comprising:
   a) providing a lignocellulosic feedstock;
   b) reducing the lignocellulosic feedstock to a particle size of less than about 2 mm in its smallest dimension;
   c) hydrolyzing a lignocellulosic feedstock in the presence of a hydrolyzing catalyst to form a first mixture comprising lignocellulosic hydrolyzate and a hydrolyzate residue comprising lignin and cellulose, wherein said hydrolyzate residue comprises from about 30% to about 55% by mass based on the initial dry weight of the lignocellulose feedstock and comprises greater than about 90% Klason lignin;
   d) treating the lignocellulosic hydrolyzate to produce a second mixture comprising hydrogen; and
   e) reacting the hydrolyzate residue of the first mixture with hydrogen in the presence of a supported metal catalyst comprising Molybdenum for sufficient time, temperature and pressure to yield an energy source.

* * * * *